US006970180B1

(12) United States Patent
Sano et al.

(10) Patent No.: US 6,970,180 B1
(45) Date of Patent: Nov. 29, 2005

(54) CONTROL APPARATUS HAVING PLURALITY OF COMMAND MEANS FOR SMOOTHLY MOVING A SUB-SCREEN ON A MAIN SCREEN

(75) Inventors: Shigeyuki Sano, Kanagawa (JP); Hiroyuki Matsuyama, Tokyo (JP); Yuzo Murayama, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/389,557

(22) Filed: Sep. 3, 1999

(30) Foreign Application Priority Data

Sep. 4, 1998 (JP) ............................... P10-251332

(51) Int. Cl.[7] ............................ G09G 5/14; H04N 9/74
(52) U.S. Cl. ...................................... 345/682; 348/588
(58) Field of Search ................................ 345/121, 145, 345/342, 438, 672, 682, 683, 799, 856, 634; 348/588; 715/799, 856

(56) References Cited

U.S. PATENT DOCUMENTS 4,642,621 A * 2/1987 Nemoto et al. ............. 345/634
5,091,785 A   2/1992 Canfield et al. ............ 358/183

FOREIGN PATENT DOCUMENTS

| EP | 0497502 | 8/1992 | ............ G06F 3/023 |
| EP | 0551168 | 7/1993 | ............ H04N 5/45 |
| EP | 0631223 | 12/1994 | ............ G06F 3/023 |
| FR | 2744551 | 8/1997 | ............ G09G 5/34 |
| GB | 2310335 | 8/1997 | ............ H04N 5/268 |

OTHER PUBLICATIONS

IBM Technical Disclsosure Bulletin, Cursor Movement Control Circuitry, Aug. 1, 1978, vol. 21, issue No. 3, pp. 1184-1186.*
Jacquelyn Gavron and Joseph Moran, How to Use Microsoft Windows NT 4 Workstation, 1996, Ziff Davis Press, p. 123.*
*Smooth Travel of Crosshair Cursor on Display Screen*, IBM Technical Disclosure Bulletin, vol. 26, No. 2, Jul., 1983, pp. 473-476.

* cited by examiner

*Primary Examiner*—Jeffery A. Brier
(74) *Attorney, Agent, or Firm*—Jay H. Maioli

(57) ABSTRACT

A video signal of a main screen is supplied from an input terminal (1) through a change-over switch (2) and an RGB drive circuit (3) to an image receiving tube (4). The video signal of a sub screen is also supplied to a sub screen signal production and control circuit (6) through an input terminal, compressed to an arbitrary size, and derived at an arbitrary positional timing to thereby produce the video signal of the sub screen. A command signal from a commanding unit is further supplied to a microcomputer (9) through an input terminal (8). In the microcomputer 9, the command signal mentioned above is supplied to a central processing unit (CPU) (10). The central processing unit produces a control signal indicating the displayed position of the sub screen or the like. In a part of the processing, the similarity and/or non-similarity of operation buttons is judged and a response time of the control is determined, whereby the actions can be carried out smoothly.

2 Claims, 5 Drawing Sheets

Sub Screen
Main Screen

Main Screen
Sub Screen

CONTROL APPARATUS HAVING PLURALITY OF COMMAND MEANS FOR SMOOTHLY MOVING A SUB-SCREEN ON A MAIN SCREEN

BACKGROUND OF THE INVENTION

1. Field of the Invention

The present invention relates to a control apparatus and a video equipment suitable for use in, for example, displaying a sub screen as a second image together with a main screen as a first image on a display screen. More particularly, this invention makes it possible to smoothly control the displayed position of, for example, the second image or the like.

2. Description of the Related Art

Control apparatuses have been materialized, wherein, for example, when an equipment is controlled by handling a key, if the same key is activated continuously, a shift of control is accelerated so that a desired control will be executed smoothly. In the apparatuses, when a key is activated intermittently, the control is changed or shifted little by little. When the same key is activated continuously, the change or shift is accelerated. Thus, either of fine adjustment and smooth control can be carried out.

In the above control apparatuses, if the control direction is two-dimensional or higher dimensional, for example, two keys may be presumably used to carry out the control. In this case, when the two keys are activated alternately, the key operation is not continuous but intermittent. Control is shifted little by little. It therefore takes too much time to carry out a desired control. Consequently, actions are not made smoothly.

By the way, a video equipment has been materialized, wherein a sub-screen regarded as a second image can be displayed together with a main screen regarded as a first image on a display screen, for example. In such a video equipment, the sub screen is displayed at one of four corners of the display screen, for example. The displayed position of the sub screen is thus limited. In the conventional equipment, therefore, there is a fear that at whichever of the corners the sub screen is displayed, an essential part of the main screen may be hidden behind the sub screen.

SUMMARY OF THE INVENTION

According to a first aspect of the present invention, the similarity and/or non-similarity of actions made by a plurality of command means is judged, so that even when the command means are activated alternately, if the similarity is judged, a response time is increased or decreased. According to this aspect even if the control direction is two-dimensional or higher dimensional, actions can be made smoothly.

According to a second aspect of the present invention, a second image is displayed at any position on a display screen according to an action made by any command means. According to this means, the drawback that an essential part of a main screen is hidden behind a sub screen can be overcome.

DESCRIPTION OF THE PREFERRED EMBODIMENTS

According to a first embodiment of the present invention, there is provided a control apparatus having a plurality of command means and which controls equipment according to respective actions made by the plurality of command means and a control method therefore. The control method and apparatus include means or a step for judging similarity and/or non-similarity of actions made by the plurality of command means and a means or a step for determining a response time of control for respective actions made by the plurality of command means. When the plurality of command means are activated alternately, if the similarity of the actions is judged, the response time is increased or decreased.

According to a second embodiment of the present invention, there is provided video equipment and a control method thereof capable of displaying a second image together with a first image on a display screen. The video equipment control method include means or a step for arbitrarily controlling the displayed position of the second image, and displaying the second image at an arbitrary position on the display screen according to an action made by any command means.

Figure 1:
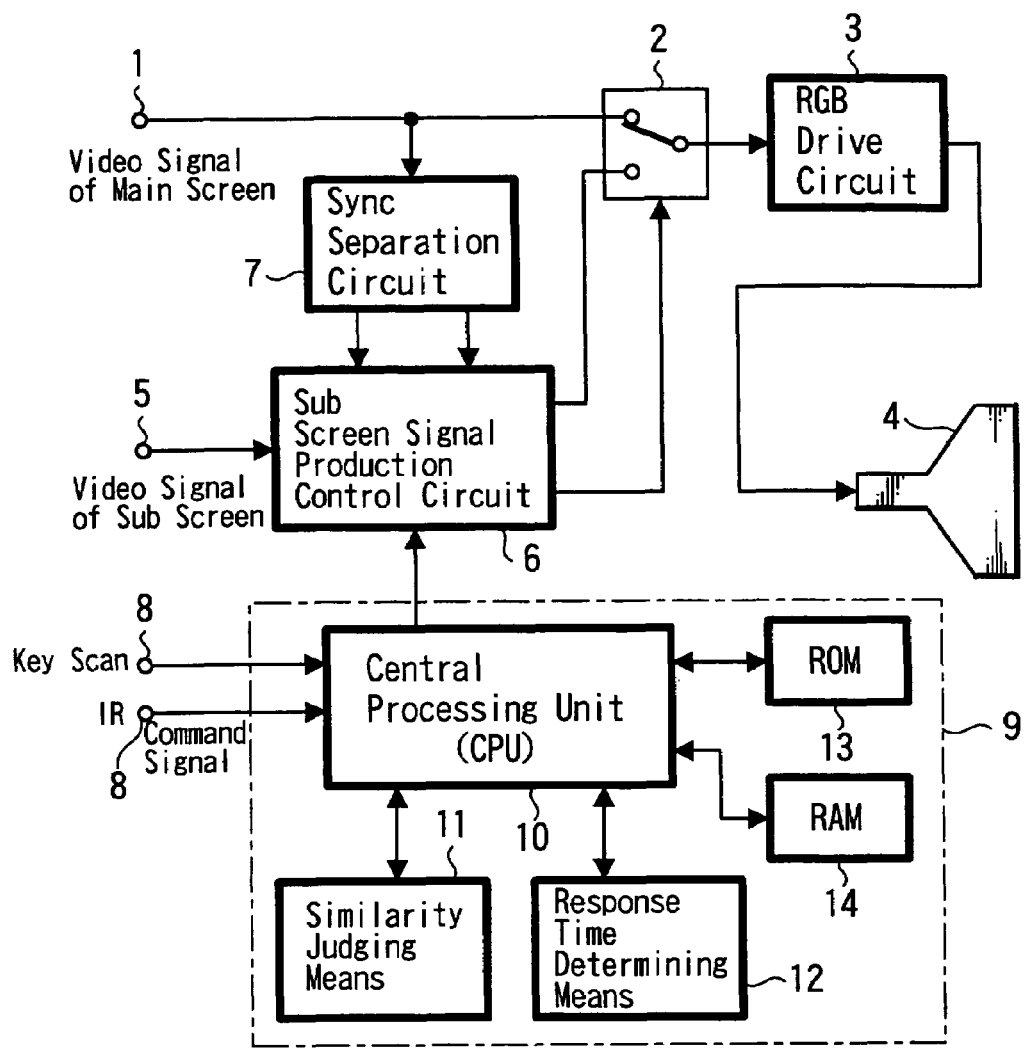
FIG. 1 is a block diagram showing the configuration of an example of a television image receiver to which a control apparatus, a video equipment and a control apparatus in accordance with the present invention are adapted.

The present invention will be described with reference to the drawings. FIG. 1 is a block diagram showing the configuration of an example of a television set to which a control apparatus and video equipment in accordance with the present invention are adapted. In this example, a main screen regarded as a first image and a sub screen regarded as a second image can be displayed on, for example, a display screen. In addition, the displayed position of the sub screen can be controlled arbitrarily.

Referring to FIG. 1, a video signal of the main screen regarded as the first image and displayed on the display screen is supplied to an input terminal 1. The video signal of the main screen is supplied to a change-over switch 2 and switched to a video signal of a sub screen described later. A video signal output from the change-over switch 2 is supplied through an RGB drive circuit 3 to an image receiving tube 4 for depicting the aforesaid display screen.

Moreover, the video signal of the sub screen regarded as the second image is supplied to a sub screen signal production and control circuit 6 through an input terminal 5. A synchronizing or sync signal separated from the video signal of the main screen by a separation circuit 7, for example, is supplied to the production and control circuit 6. By this signal and a change of a reading speed at which data is read from an internal memory of the production and control circuit 6, the video signal of the sub screen is compressed to an arbitrary size and derived at an arbitrary timing on the display screen, whereby the video signal of the sub screen is produced.

The resultant video signal of the sub screen is supplied to the change-over switch 2. The production and control circuit 6 produces a switching signal whose timing corresponds to the timing of sweeping any position on the display screen. The change-over switch 2 is then changed over in response to the switching signal. Moreover the reading speed at which data is read from the internal memory of the production and control circuit 6 is changed. As a result, a sub screen of any size is composed at any position on the main screen.

Furthermore, a command signal entered using any command means, for example, a key scan or infrared rays (IR) emitted from a remote controller or the like is supplied to a microcomputer 9 through an input terminal 8. In the microcomputer 9, the command signal is supplied to a central processing unit (CPU) 10. A control signal defining the displayed position of the sub screen or the like is produced, and the control signal thus produced is supplied to the sub screen signal production and control circuit 6. Thus, the display position of the sub screen and others are controlled.

Figure 2A:
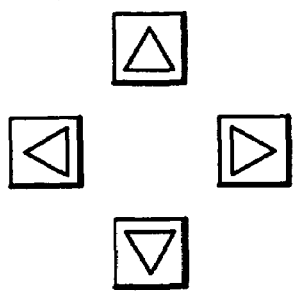
FIG. 2 is a structural diagram showing the arrangement of operation buttons and a joystick serving as a plurality of command means.
Figure 2B:
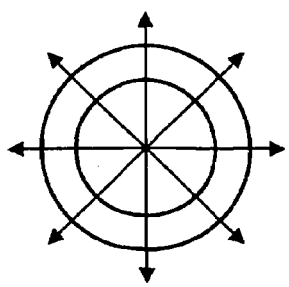

Command signals from a plurality of command means as shown in FIG. 2 are supplied to the input terminal 8. That is, referring to FIG. 2A, command signals indicating respective directions are supplied from four operation buttons of Up, Down, Right, and Left buttons. Also, referring to FIG. 2B, a so-called joystick is used to supply command signals indicating eight directions shown by arrows which are then supplied to the input terminal. The operation buttons or the joystick are located on an equipment body or a remote controller.

Figure 3A:
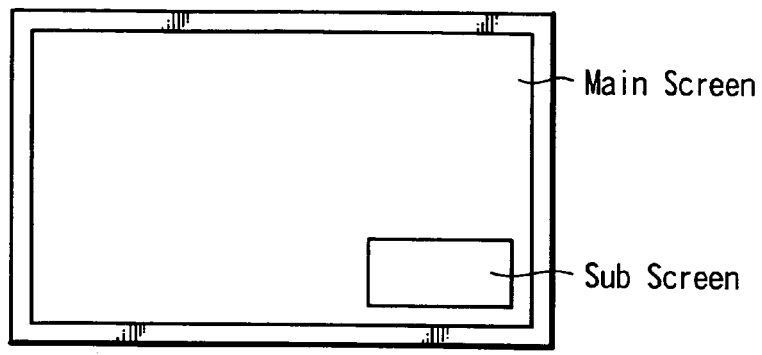
FIG. 3A to FIG. 3C are each an explanatory diagram used to explain actions made according to a first embodiment.
Figure 3B:
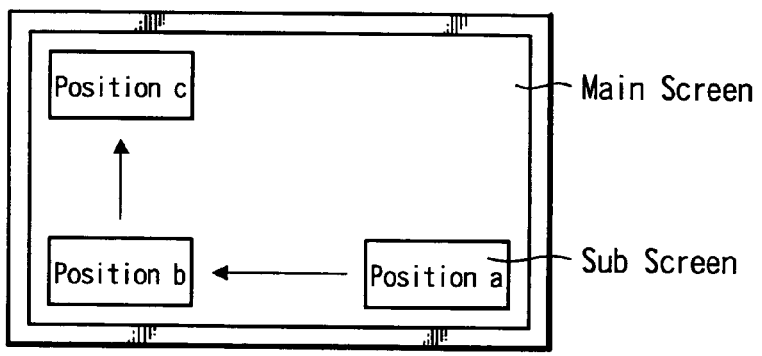
Figure 3C:
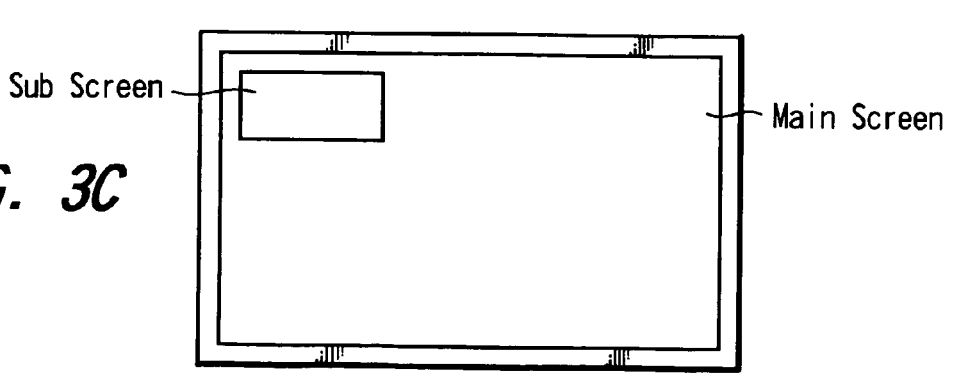

Assume that the sub screen is displayed at the right lower corner of the main screen as shown in FIG. 3A. In this state, when the operation button directed to the left is pressed as shown in FIG. 3B, the sub screen is moved leftward. When the operation button directed to the upward is pressed further, the sub screen is moved upward. Consequently, the sub screen is displayed at the left upper corner of the main screen as shown in FIG. 3C. Thus, the sub screen can be displayed at any or arbitrary position on the main screen.

At this time, when, for example, the operation button directed to the left is pressed, the sub screen is moved slowly first. When the same operation button is kept pressing, the moving speed of the sub screen is increased gradually. This is intended to allow both fine adjustment and smooth control satisfactory. By contrast, in the conventional units, when the up-directed button is pressed next, the sub screen is moved slowly again. Thus, actions are made slowly but not smoothly.

Figure 4:
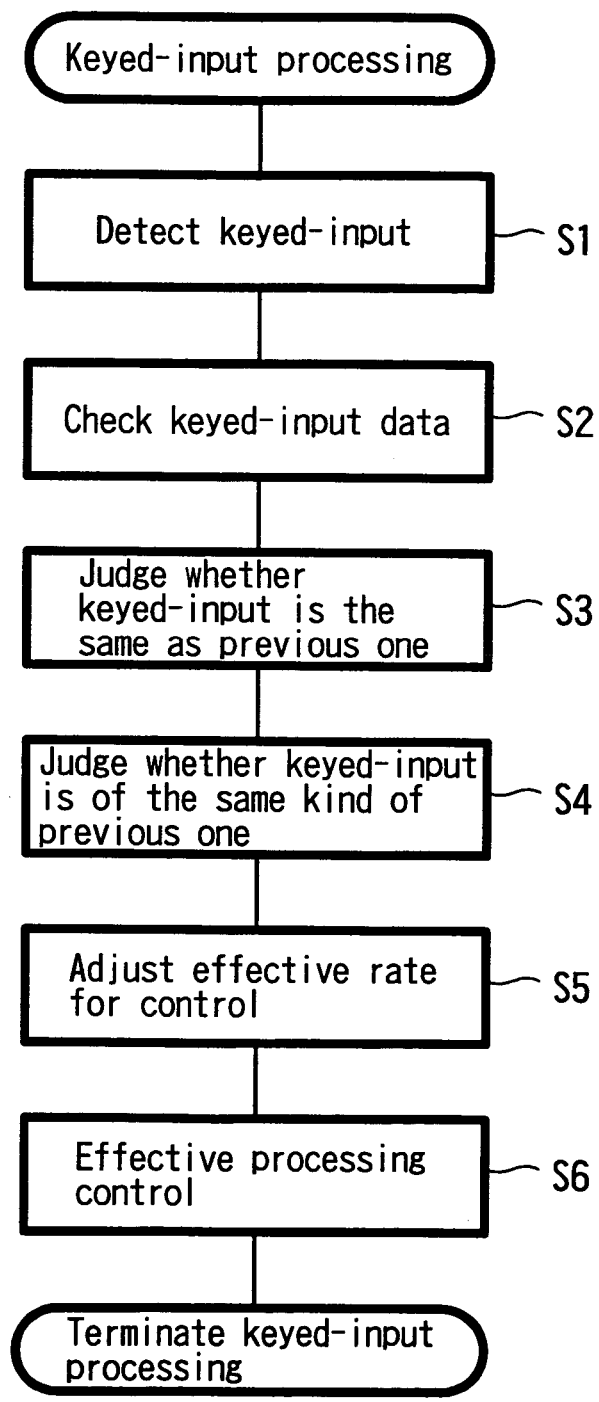
FIG. 4 is a flowchart explaining the actions of the first embodiment.

Therefore, according to the aforesaid configuration, a means 11 for judging similarity and/or non-similarity of operation buttons and means 12 for determining a response time of the control are included as a part of processing in the microcomputer 9. Using the judging means and response time, it is possible to control smoothly the above actions. FIG. 4 shows a flow demonstrating how the microcomputer 9 processes a keyed-input, for example.

Referring to FIG. 4, when the processing is started, a keyed-input using the operation button or joystick mentioned above is detected at step S1. Data of the keyed-input is checked at step S2. It is judged at step S3 whether the keyed-input is the same as the previous input. At step S4, it is judged whether the keyed-input is of the same kind as the previous input. An effective rate of the control is adjusted at step S5. The effective process of control is then executed at step S6. Then keyed-input processing is terminated.

During the processing, if it is judged at step S3 that the keyed-input is the same as the previous input, such an adjustment that the effective rate of the control is increased gradually is carried out at step S5. If it is judged at step S4 that the keyed-input is of the same kind as the previous input, the effective rate of control is increased gradually. By contrast, if it is not judged at step S3 and S4 that the keyed-input is the same as or of the same kind as the previous input, the effective rate of the control is returned to the initial value.

In other words, when the means 11 for judging the similarity and/or non-similarity of the operation buttons judges the similarity of the operation buttons, the means 12 for determining the response time of the control judges that the same operation button has been activated, and increases or decreases the response time. When the up-directed button is pressed after the left-directed button mentioned above is pressed, movement is kept accelerated, while actions are thus made smoothly.

Judging of the similarity and/or non-similarity of the operation buttons is conducted, on the basis of a table listing combinations of similarities stored in, for example, a read-only memory (ROM) 13 or the like, or by comparison of keyed-input data with immediately preceding keyed-input data stored in, for example, a random-access memory (RAM) 14 by the judging means 11.

In the foregoing control apparatus or equipment, the similarity and/or non-similarity of actions made by a plurality of command means is judged, and even when the command means are activated alternately, if the similarity is judged, the response time is increased or decreased. Therefore, even when the control direction is two-dimensional or higher dimensional, the actions can be made smoothly.

In the conventional apparatuses or equipments, there is a fear that when the control direction is two-dimensional or higher dimensional, the actions may not be made smoothly. According to the present invention, this drawback can be overcome readily.

An object to be controlled by the aforesaid apparatus or equipment is not limited to the displayed position of the sub screen on the main screen. The aforesaid unit or equipment can be employed in controlling the position of a cursor or a pointer. Moreover, the present invention is not limited to control of a position on the display screen. The present invention may be employed in setting a listening position for a four-channel acoustic system or in controlling a hue and saturation or the like in two or more dimension.

In the foregoing apparatus or equipment, the sub screen can be, as shown in, for example, FIG. 5, moved to any position on the display screen by using the operation buttons or joystick. That is, FIG. 6 shows a flow demonstrationally how the microcomputer 9 sets the position of the sub screen.

Figure 6:
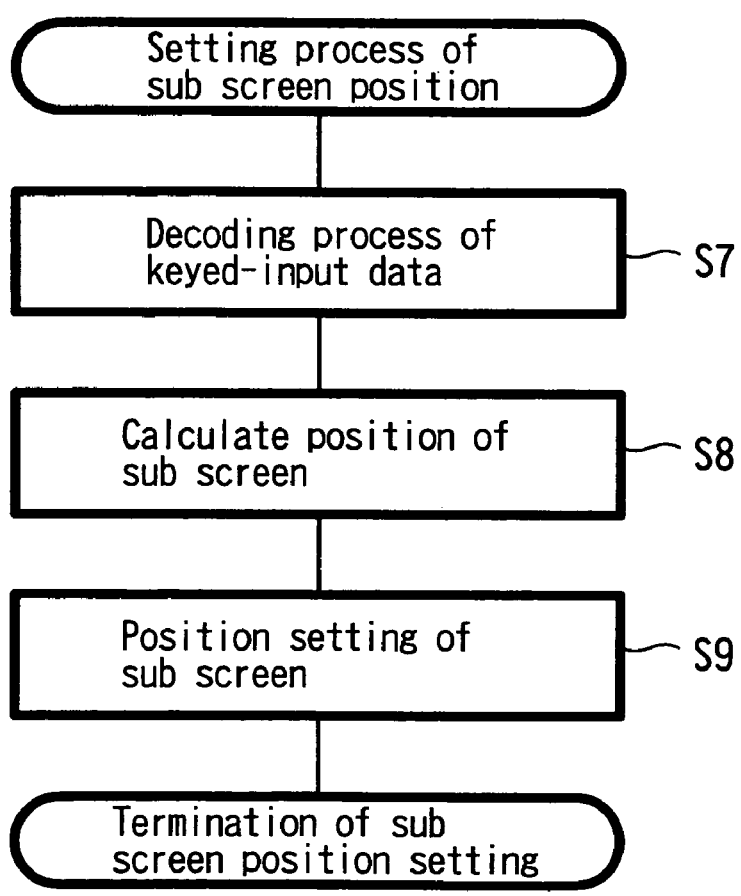
FIG. 6 is a flowchart explaining the actions of the second embodiment.

Referring to FIG. 6, when the processing is started, keyed-input data is decoded at step S7. Keyed-input data is acquired at every interval of the aforesaid response time, for example. At step S8, keyed-input data is added up at every direction to calculate the position of the sub screen. The position of the sub screen is set at the calculated position at step S9. Then, the sub screen position setting process is terminated.

In the aforesaid unit or equipment, a second image is displayed at any position on the display screen according to an action made by any command means. As a result, the drawback that an essential part of the main screen is hidden behind the sub screen can be overcome.

At the time of moving the position of the sub screen, by judging the similarity of the operation buttons, it is possible to carry out the moving actions smoothly.

Figure 5A:
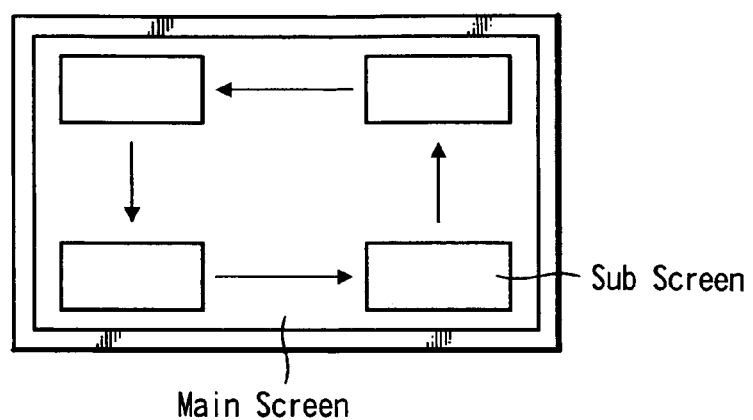
FIG. 5A and FIG. 5B are each an explanatory diagrams used to explain actions made according to a second embodiment.
Figure 5B:
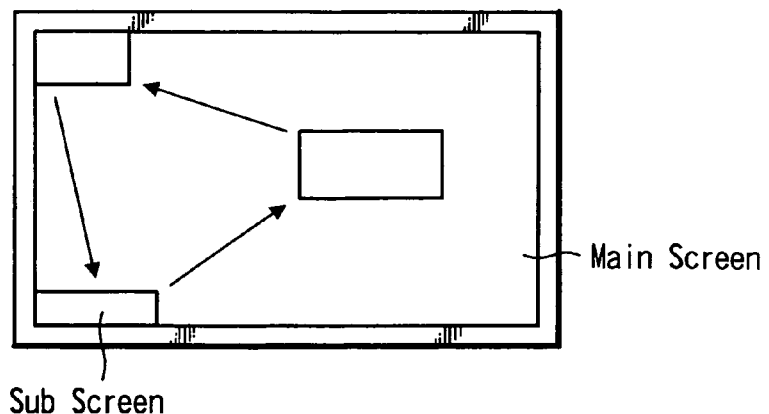

In the foregoing unit or equipment, the displayed position of the sub screen is not limited to the inside of the main screen as shown in FIG. 5A, but the sub screen may be, as shown in FIG. 5B, set outside an effective screen area of the display screen.

Furthermore, information of the displayed position may be recorded and held in, for example, 14 random-access memory (RAM) 14. For example, even after the apparatus or equipment is left unused for some time, when it is reused, the sub screen or the like can be displayed at the previous displayed position.

As for the sub screen regarded as the second image, not only a picture represented by a video signal such as a picture to be broadcast or the like, but also a menu screen used to set the apparatus or equipment and so on can be displayed. Moreover, a plurality of sub screens may be displayed.

According to the first embodiment of the present invention, there is provided the control apparatus and the control method having a plurality of command means and controlling the equipment according to actions made by the plurality of command means. The control apparatus and control method includes the means or the step for judging the similarity and/or non-similarity of the respective actions to be made by the plurality of command means, and the means or the step for determining a response time of control in response to each action made by each of the plurality of command means. When the plurality of command means are activated alternately, if the similarity thereof is judged, the response time is increased or decreased. Thus, even when the control direction is two-dimensional or higher dimensional, the actions can be made smoothly.

According to the second embodiment of the present invention, there is provided the video equipment control apparatus and the control method which are capable of displaying a second image together with a first image on a display screen and which include the means or the step for arbitrarily controlling the displayed position of the second image. The second image is displayed at any position on the display screen according to an action made by any command means, whereby the drawback that, for example, an essential part of a main screen is hidden behind a sub screen and so on can thus be overcome.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A control apparatus for controlling a displayed position of a sub-screen displayed together with a main screen on a display screen, comprising:

first command means to control said position of said sub-screen in a first direction;

second command means to control said position of said sub-screen in a second direction; and processing means for receiving command signals from said first and second command means and for outputting a control signal;

sub-screen signal production control means for compressing a sub-screen video signal and for producing a switching signal in response to said control signal output from said processing means; and a change-over switch for switching between a video signal of said main screen and said compressed sub-screen video signal, wherein said change-over switch is controlled by a timing of said switching signal produced by said sub-screen signal production control means to change said displayed position of said sub-screen in response to said first and second command means;

wherein said processing means increases at a predetermined moving speed said displayed position of said sub-screen from an initial moving speed when one of said first and second command means is activated continuously;

wherein said processing means judges similarity of said command signals when another one of said first and second command means is activated at the state of said predetermined moving speed; and wherein said processing means continues said predetermined increase of moving speed when said similarity is found and returns to said initial moving speed when said similarity is not found.

2. A control method for controlling a displayed position of a sub-screen displayed together with a main screen on a display screen using a first command means to control said position of said sub-screen in a first direction and a second command means to control said position of said sub-screen in a second direction, said control method comprising the steps of:

compressing a sub-screen video signal;

receiving command signals from said first command means and said second command means and outputting a control signal producing a switching signal in response to said control signal;

switching between a video signal of said main screen and said compressed sub-screen video signal in response to a timing of said switching signal to change said displayed position of said sub-screen in response to said first and second command means;

increasing at a predetermined moving speed said displayed position of said sub-screen from an initial moving speed when one of said first and second command means is activated continuously;

judging similarity of said command signals when another one of said first and second command means is activated at the state of said predetermined moving speed; and continuing said predetermined increase of moving speed when said similarity is found by said step of judging similarity and returning to said initial moving speed when said similarity is not found.

* * * * *